United States Patent
Sawasaki et al.

(10) Patent No.: US 7,864,279 B2
(45) Date of Patent: Jan. 4, 2011

(54) LIQUID CRYSTAL DISPLAY COMPRISING A POINT-LIKE PROTRUSION AND A COMMON ELECTRODE HAVING A CONCAVE PORTION

(75) Inventors: Manabu Sawasaki, Kanagawa (JP); Takashi Takagi, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 227 days.

(21) Appl. No.: 11/390,473

(22) Filed: Mar. 28, 2006

(65) Prior Publication Data

US 2006/0227269 A1    Oct. 12, 2006

(30) Foreign Application Priority Data

Mar. 29, 2005    (JP) ............... 2005-093607

(51) Int. Cl.
G02F 1/1337    (2006.01)
C09K 19/02    (2006.01)

(52) U.S. Cl. ........................ 349/129; 349/178

(58) Field of Classification Search ............... 349/129, 349/122, 178
See application file for complete search history.

(56) References Cited

U.S. PATENT DOCUMENTS

| | | | |
|---|---|---|---|
| 6,671,025 B1 * | 12/2003 | Ikeda et al. ............... 349/156 |
| 6,836,308 B2 * | 12/2004 | Sawasaki et al. ............ 349/129 |
| 7,209,201 B2 * | 4/2007 | Lin et al. ................... 349/129 |
| 2004/0075798 A1 * | 4/2004 | Inoue et al. ................. 349/129 |
| 2004/0119924 A1 | 6/2004 | Takeda et al. |
| 2005/0030458 A1 * | 2/2005 | Sasabayashi et al. ........ 349/129 |
| 2005/0140886 A1 * | 6/2005 | Kim et al. ................... 349/129 |
| 2005/0213007 A1 * | 9/2005 | Wu ............................ 349/129 |

FOREIGN PATENT DOCUMENTS

JP    10-177109    6/1998

OTHER PUBLICATIONS

JP11-242225 dated Sep. 7, 1999 is a counterpart application of US 2004/0119924 listed above.

* cited by examiner

*Primary Examiner*—Mark A Robinson
*Assistant Examiner*—Charles Chang
(74) *Attorney, Agent, or Firm*—Nixon & Vanderhye P.C.

(57) ABSTRACT

The invention relates to a vertically aligned liquid crystal display and a method of manufacturing the same and provides a liquid crystal display in which singular points can be sufficiently controlled to achieve high display quality and a method of manufacturing the same. A surface of the common electrode facing at least one-fourth of a non-electrode part at the outer periphery of the electrode unit is formed with a height of 0.2 μm or more or a height in the range from 0.4 to 1.5 μm if possible above a surface of the common electrode facing a part of the electrode unit substantially in the middle thereof.

5 Claims, 14 Drawing Sheets

SECTION A-A'

SECTION B-B'

SECTION C-C'

REGION HAVING ABNORMALITY IN ALIGNMENT

LIQUID CRYSTAL DISPLAY COMPRISING A POINT-LIKE PROTRUSION AND A COMMON ELECTRODE HAVING A CONCAVE PORTION

BACKGROUND OF THE INVENTION

1. Field of the Invention

The present invention relates to a liquid crystal display and a method of manufacturing the same and, more particularly, to a vertically aligned liquid crystal display and a method of manufacturing the same.

2. Description of the Related Art

In a vertically aligned liquid crystal display, a liquid crystal having negative dielectric constant anisotropy is vertically aligned using vertical alignment films when no voltage is applied and aligned at a tilt when a voltage is applied. Since liquid crystal molecules are vertically aligned when no voltage is applied, a vertically aligned liquid crystal display has advantages including high quality in displaying black, and capability of displaying at a high contrast, a wide viewing angle, and high response.

For example, methods of regulating the alignment of the liquid crystal of such a vertically aligned liquid crystal display include a pixel configuration as disclosed in JP-A-2004-266560. FIG. 25 is a plan view of a pixel showing a pixel configuration according to the specification. Referring to FIG. 25, a region defined by gate bus lines 14 and drain bus lines 16 is a pixel region, and a pixel electrode 20 is formed in the pixel region, the pixel electrode including three electrode units in the form of rectangles having rounded corners. A storage capacitor bus line 22 is formed in the middle of the pixel substantially in parallel with the gate bus lines 14. A storage capacitor electrode 34 is formed above the storage capacitor bus line 22 with an insulation film (not shown) interposed between them. On an opposite substrate which faces the pixel region with a liquid crystal interposed between them, a point-like alignment regulating structure is formed in a position substantially in the middle of each electrode unit. In such a configuration, as shown in FIG. 26, liquid crystal molecules 76 aligned vertically to the substrates are tilted by distortion of electric fields generated at edges of the electrode units and the alignment regulating structures on the opposite substrate when a voltage is applied, whereby the liquid crystal molecules are aligned in directions from the peripheries of the electrode units toward the centers of the same.

However, since the electrode units themselves of the liquid crystal display in the example are entirely composed of solid patterns as shown in FIG. 27, there will be a large area in which the alignment of liquid crystal molecules can not be controlled with the electrode units when the patterns are large. In particular, since there is no measure for fixing singular points of liquid crystal alignment outside the electrode units, variation occurs in positions where singular points are generated. For this reason, it is difficult to align liquid crystal molecules in directions from the peripheries of the electrode units toward the centers thereof uniformly, and there will be a region having abnormal alignment as illustrated which will appear as granularity in display.

When an external force is applied to the panel of the liquid crystal display by a press with a finger, it is difficult to restore the initial state of singular points which are thus once disturbed.

Further, when edges of the electrode units are close to gate bus lines or drain bus lines, the original liquid crystal alignment is affected by electric fields generated between the edges and the bus lines.

A method of manufacturing color filters disclosed in JP-A-10-177109 includes a first step of forming a light shield layer on a substrate, forming a photosensitive resist layer on the light shield layer, exposing and developing the photosensitive resist layer in a predetermined pattern; etching the exposed light shield layer to form a black matrix constituted by the light shield layer having the predetermined pattern; and curing the photosensitive resist layer on the black matrix to provide a resist layer and a second step of repeating an operation of forming a color layer in a region for forming a layer in a predetermined color in a region of the substrate where the black matrix is not formed and in a region of the resist layer where a columnar spacer is to be formed, a number of times equivalent to the number of colors of color layers to be formed.

However, the gist of the prior document is to form a spacer for maintaining a cell gap by forming color layers on the resist on the black matrix one after another. In the structure disclosed in the specification, since a surface of a common electrode on a CF substrate facing a central part of a pixel electrode unit is at the same height as a surface of the common electrode of the CF substrate facing a non-electrode part at the outer periphery of the electrode unit, there is no measure for fixing singular points of liquid crystal alignment outside the electrode unit, which results in a problem that there is a large area in which the alignment of liquid crystal molecules cannot be controlled.

As thus described, difficulty in controlling singular points increases when the size of an electrode unit is increased. For this reason, an electrode unit is limited to a predetermined size in practice.

SUMMARY OF THE INVENTION

It is an object of the invention to provide a liquid crystal display in which singular points can be sufficiently controlled to achieve high display quality and a method of manufacturing the same.

In order to solve the problem, there is provided a liquid crystal display comprising a first substrate having a pixel electrode including one or more electrode units electrically connected to each other, a second substrate facing the pixel and having a light shield portion constituted by a metal film, a color separation filter at an opening thereof, and a common electrode on a surface thereof, and a liquid crystal layer having negative dielectric constant anisotropy sealed between the first substrate and the second substrate, wherein a surface of the common electrode facing at least one-fourth of a non-electrode part at the outer periphery of the electrode unit is formed with a height of 0.2 μm or more or a height in the range from 0.4 to 1.5 μm if possible above a surface of the common electrode facing a part of the electrode unit substantially in the middle thereof.

It is further advantageous to provide a protrusion for regulating the alignment of a liquid crystal on the common electrode on the second substrate facing the part of the electrode unit substantially in the middle thereof.

The step provided like that can be formed under the common electrode by forming a photo-resist and a color separation filter in the order listed on the metal light shield film.

In this case, the metal light shield film is formed using photolithography and etching, and the photo-resist used for patterning the film is baked and left on the metal light shield film to adjust the height of the surface of the common electrode, whereby the process can be simplified.

It is expected that the same advantage can be achieved by forming color separation filter layers in different colors one after another on the metal light shield film.

According to the invention, since the surface of the common electrode facing the non-electrode part at the outer periphery of the electrode unit is at a height of 0.2 μm or more or at a height in the range from 0.4 to 1.5 μm if possible above the height of the surface of the common electrode facing the part of the electrode unit substantially in the middle thereof, electric fields at the outer periphery of the electrode unit have a strong force of regulating liquid crystal alignment. Thus, more stable liquid crystal alignment is achieved, and any disturbance of alignment attributable to an external force can be corrected to provide a liquid crystal display having high display quality and stability.

A step can be formed on the common electrode without any unnecessary pattern protruding into a transmissive part by forming the photo-resist and the color separation filter layer in the order listed on the metal light shield film or forming the color separation filter layers in different colors one after another on the metal light shield film. It is therefore possible to provide a low-cost and high quality liquid crystal display without any additional process for forming the step.

Further, since the metal light shield film is formed using photolithography and etching, and the photo-resist used for patterning is baked and left on the metal light shield film, the height of the surface of the common electrode can be adjusted in an ideal position, which makes it possible to provide a liquid crystal display of high accuracy and high quality without any additional process.

DESCRIPTION OF THE PREFERRED EMBODIMENTS

First Embodiment

A liquid crystal display and a method of manufacturing the same according to a first embodiment of the invention will now be described with reference to FIGS. 1 to 11.

Figure 1:
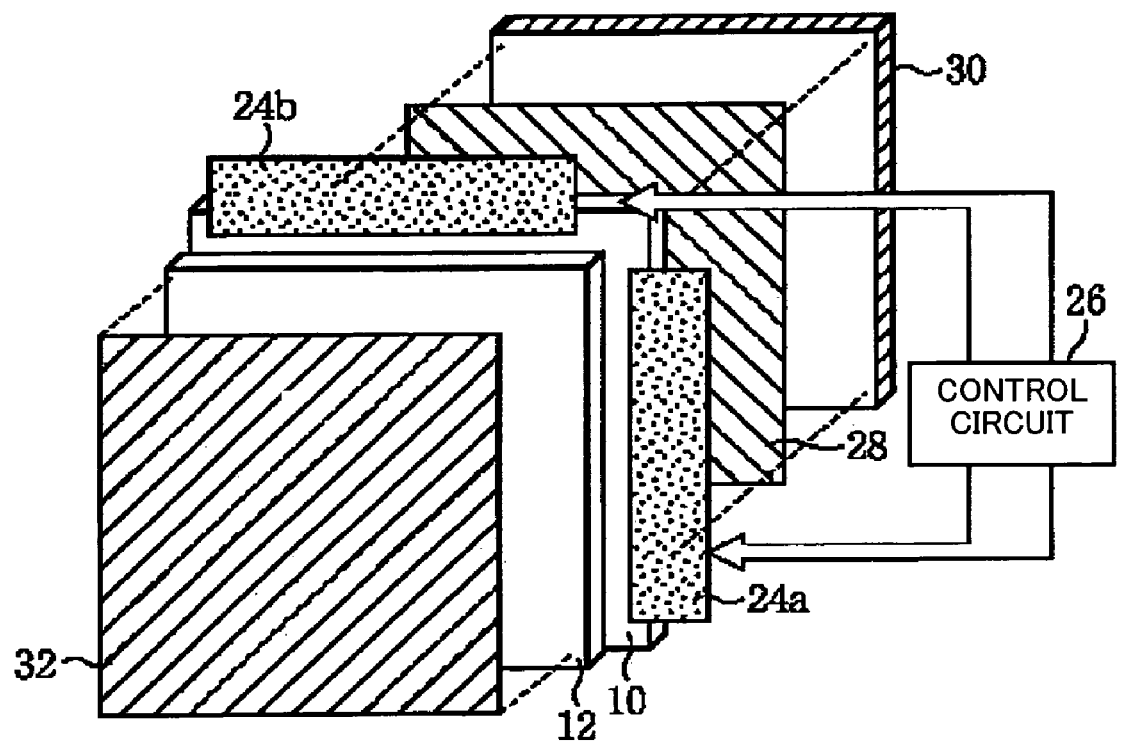
FIG. 1 shows a schematic configuration of a liquid crystal display according to a first embodiment of the invention.

As shown in FIG. 1, the liquid crystal display of the present embodiment has a structure in which a TFT substrate 10 having TFT (thin film transistors) formed thereon and a CF substrate 12 having CFs (color filters) formed thereon are combined in a face-to-face relationship and in which a liquid crystal is sealed between the substrates 10 and 12.

Figure 2:
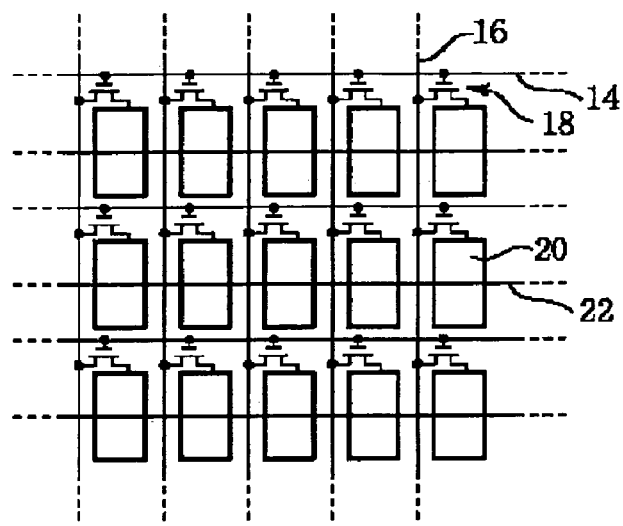
FIG. 2 is an equivalent circuit diagram of the liquid crystal display according to the first embodiment of the invention.

FIG. 2 schematically shows an equivalent circuit of elements formed on the TFT substrate 10. A plurality of gate bus lines extending in the horizontal direction in the figure are formed in parallel with each other on the TFT substrate 10. A plurality of drain bus lines 16 extending in the vertical direction in the figure are formed in parallel with each other so as to intersect with the gate bus lines 14 with an insulation film interposed between them. Each of regions surrounded by the plurality of gate bus lines 14 and drain bus lines 16 constitute a pixel region. A TFT 18 and a pixel electrode 20 are formed at each of the pixel regions which are disposed in the form of a matrix. A drain electrode of each TFT 18 is connected to a drain bus line 16 adjacent to the same. A gate electrode of the TFT is connected to a gate bus line 14 adjacent to the same. A source electrode of the TFT is connected to the pixel electrode 20. A storage capacitor bus line 22 is formed substantially in the middle of each pixel region in parallel with the gate bus lines 14.

Referring again to FIG. 1, a gate bus line driving circuit 24a loaded with a driver IC (integrated circuit) for driving the plurality of gate bus lines 14 and a drain bus line driving circuit 24b loaded with a driver IC for driving the plurality of drain bus lines 16 are provided on the TFT substrate 10. The driving circuits 24a and 24b output predetermined scan signals and data signals to predetermined gate bus lines 14 and drain bus lines 16 based on predetermined signals output by a control circuit 26. A polarizer 28 is provided on a substrate surface of the TFT substrate 10 opposite to the surface thereof on which the elements are formed, and a backlight unit 30 is mounted on a surface of the polarizer 28 opposite to the surface thereof facing the TFT substrate 10. A polarizer 32 is applied to a surface of the CF substrate 12 opposite to the surface thereof on which the color filters are formed.

A detailed description will now be made on the substrates and cells which constitute the liquid crystal display.

Figure 3:
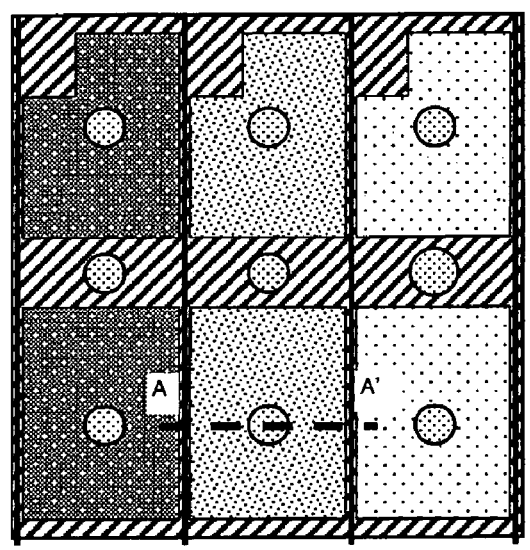
FIG. 3 is a (plan) view of the liquid crystal display according to the first embodiment of the invention.
Figure 4:
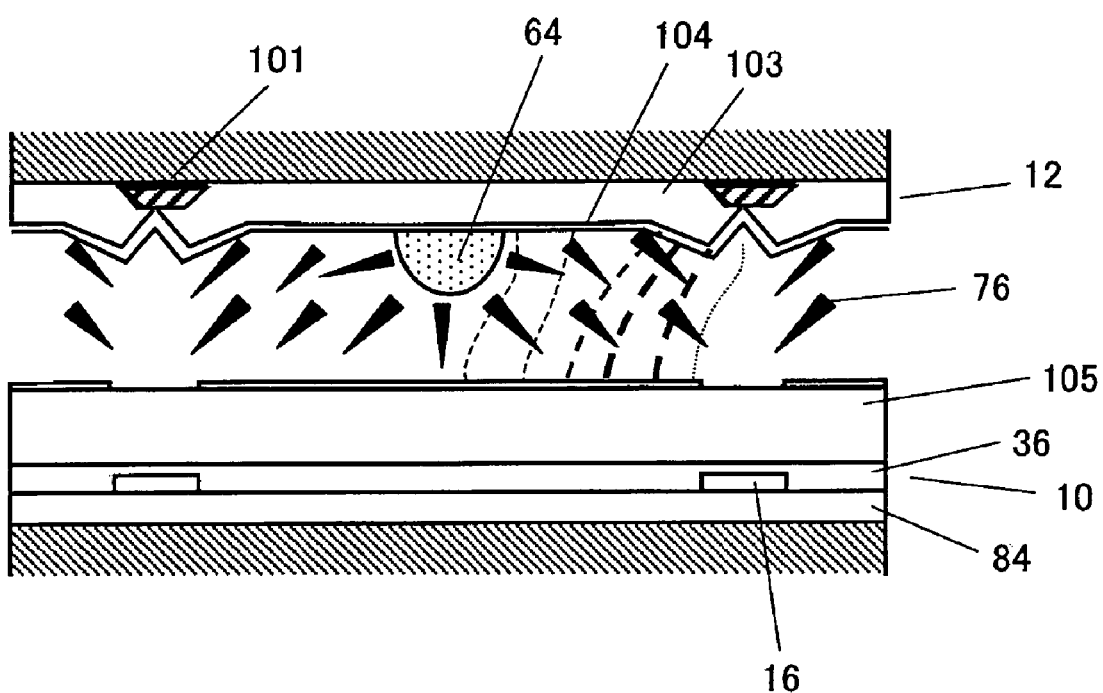
FIG. 4 is a (sectional) view of the liquid crystal display according to the first embodiment of the invention.

FIG. 3 is a front view of a pixel region of the liquid crystal display of the present embodiment. FIG. 4 shows a section taken along the line A-A in FIG. 3. As shown in FIG. 4, the display has a structure in which the TFT substrate 10 having TFTs formed thereon and the CF substrate 12 having color filters formed thereon are combined in a face-to-face relationship and in which a liquid crystal is sealed between the substrates 10 and 12.

Referring to the TFT substrate 10, the drain bus lines 16 are formed on an insulation film 84, and the pixel electrodes are formed on a final protection film 105 provided on a protective film 36 on the drain bus lines 16.

In the present embodiment, a photo-resist used for patterning a black matrix (BM) layer 10 to provide a BM pattern by a photolithographic process at a step for fabricating the CF substrate 12 is left on the substrate instead of stripping it off, and CF layers 103 are formed on the photo-resist. Thus, the height of the common electrode on the BM pattern is adjusted in the resultant structure. A common electrode 104 is formed on the CF layers 103. An alignment regulating structure 64 is formed on the common electrode 104, the structure being located in the middle of a pixel.

A structure of the TFT substrate 10 in the present embodiment will now be described.

Figure 5:
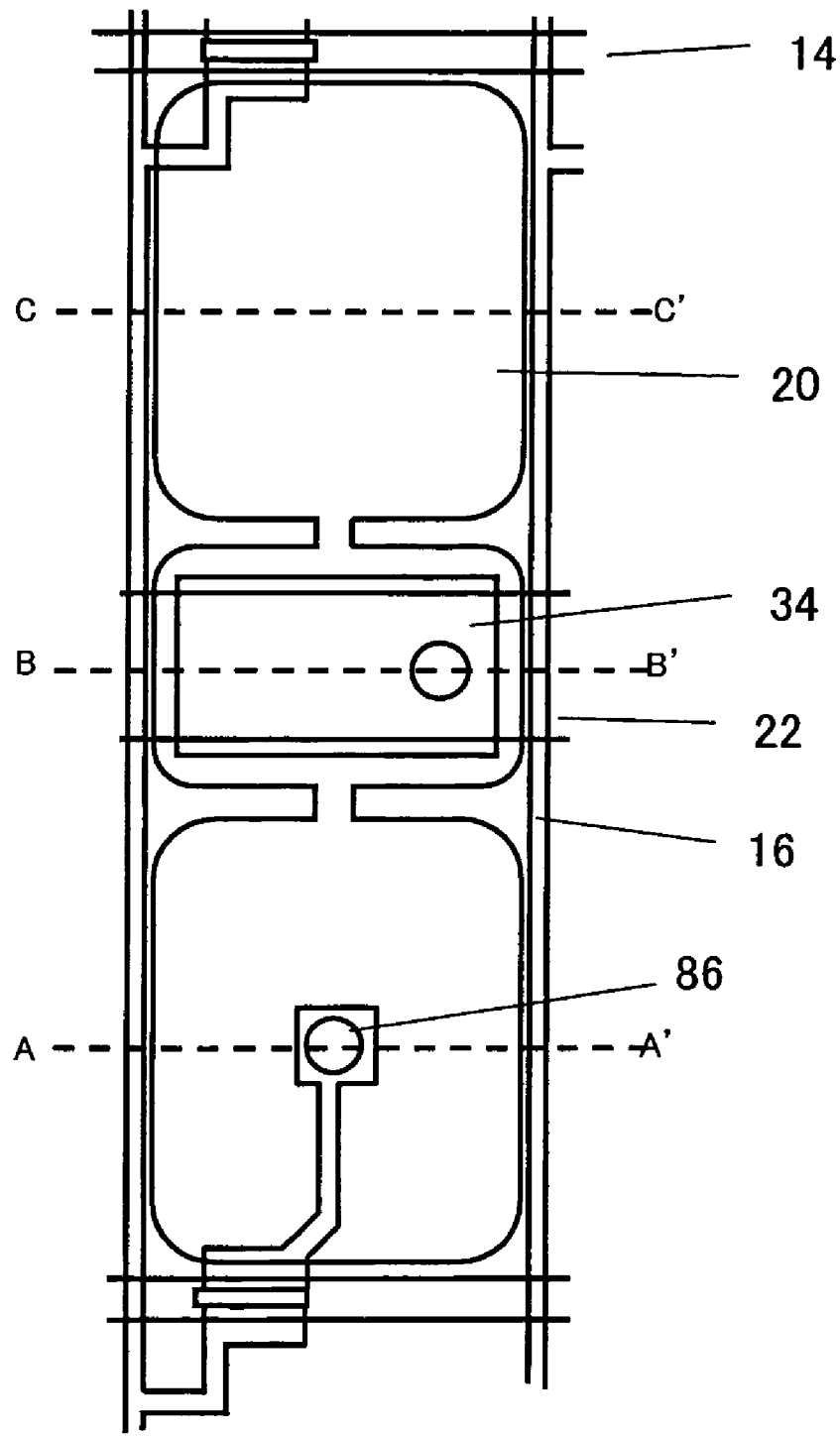
FIG. 5 is a (plan) view of a TFT substrate according to the first embodiment of the invention.
Figure 6A:
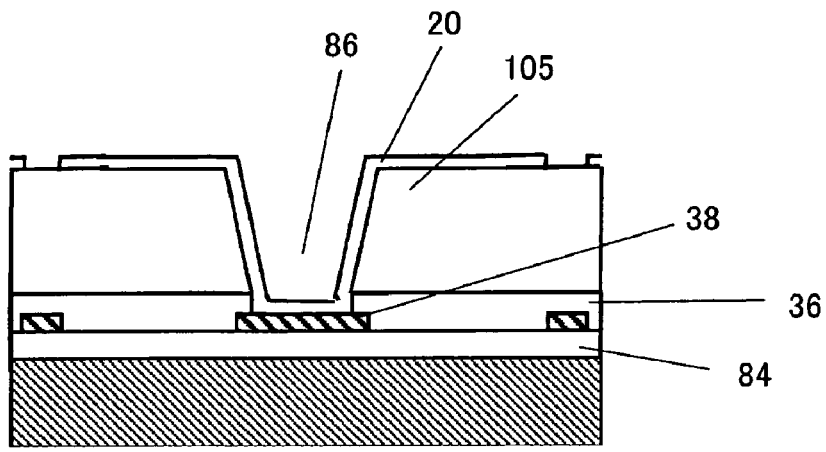
FIGS. 6A to 6C are (sectional) views of the TFT substrate according to the first embodiment of the invention.
Figure 6B:
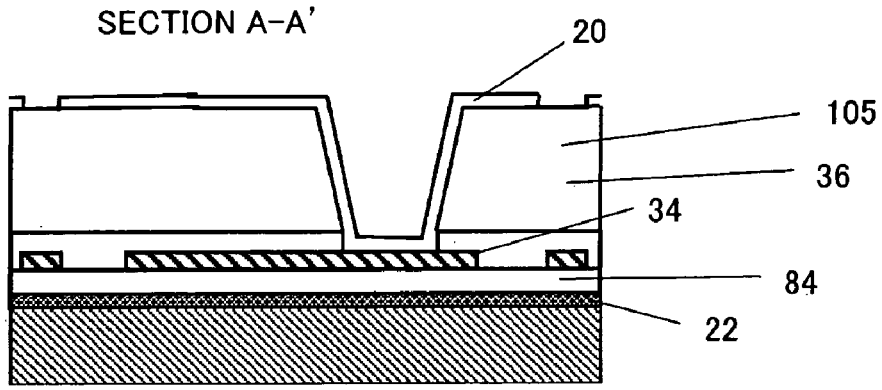
Figure 6C:
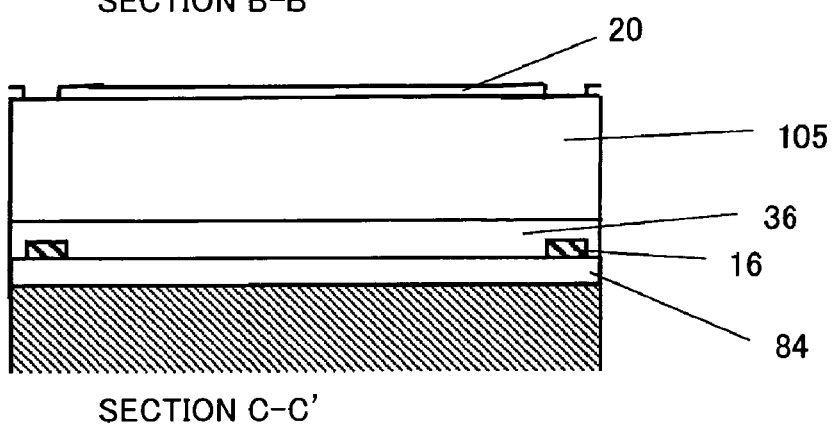

FIGS. 5 to 6C show a configuration of one pixel of the liquid crystal display in the present embodiment. FIG. 6A is a sectional view taken along the line A-A' in FIG. 5. FIG. 6B is a sectional view taken along the line B-B' in FIG. 5. FIG. 6C is a sectional view taken along the line C-C' in FIG. 5. As illustrated, the plurality of gate bus lines 14 extending in the horizontal direction in FIG. 5 are formed on the TFT substrate 10 substantially in parallel with each other at intervals of, for example, 300 μm (two of the lines are shown in FIG. 5). The plurality of drain bus lines 16 extending in the vertical direction in FIG. 5 are formed substantially on parallel with each other at intervals of, for example, 100 μm so as to intersect with the gate bus lines 14 substantially perpendicularly (two of the lines are shown in FIG. 5), the insulation film 84 constituted by, for example, a silicon oxide film being interposed between the lines. For example, the gate bus lines 14 and the drain bus lines 16 have widths of 10 μm and 7 μm, respectively. Regions surrounded by the plurality of gate bus lines 14 and drain bus lines 16 constitute pixel regions. The storage capacitor bus lines 22 substantially in parallel with the gate bus lines 14 are formed to extend across the pixel regions substantially in the middle thereof. The storage capacitor electrode 34 is formed at each pixel above the storage capacitor bus line 22 with an insulation film interposed between them. The drain bus lines, drain electrodes, source electrodes, and storage capacitor electrodes are formed in the same layer at a time, and the protective film 36 is formed on the layer using, for example, SiN. A transparent resin insulation layer 105 having a thickness of, for example, 3 μm is formed on the protective film 36. Conduction is established between the pixel electrodes 20 which are provided on the transparent resin insulation layer 105 and the drain electrodes through contact holes 86 provided in the protective film 36 and the transparent resin insulation layer 105.

A method of forming the CF substrate of the present embodiment will now be described with reference to FIGS. 7 to 11. FIGS. 7 to 11 show a sectional view of the CF substrate taken at each step. A BM (black matrix) as a light shield layer for blocking light between colors is formed on the CF substrate 12 provided opposite to the TFT substrate 10. The BM is formed in the form of a grid which has a width of, for example, 10 μm between colors.

Figure 7:
FIG. 7 is an illustration (a sectional view along line A-A') of a method of manufacturing color filters according to the first embodiment of the invention.
Figure 8:
FIG. 8 is an illustration (a sectional view along line A-A') of the method of manufacturing color filters according to the first embodiment of the invention.
Figure 9:
FIG. 9 is an illustration (a sectional view along line A-A') of the method of manufacturing color filters according to the first embodiment of the invention.

First, a method of forming the BM layer will be described with reference to FIGS. 7 to 9. A film of a light shield metal 101 such as chromium is formed on a transparent insulation substrate 60 such as glass (FIG. 7). Then, a positive resist 102 is applied to the same to a thickness of, for example, 1.5 μm, and a desired BM pattern is formed using a photolithographic process (FIG. 8). Next, the light shield metal film is etched using nitric acid and is thereafter baked for one hour in an over at 220° C. to complete a BM layer (FIG. 9).

Figure 10:
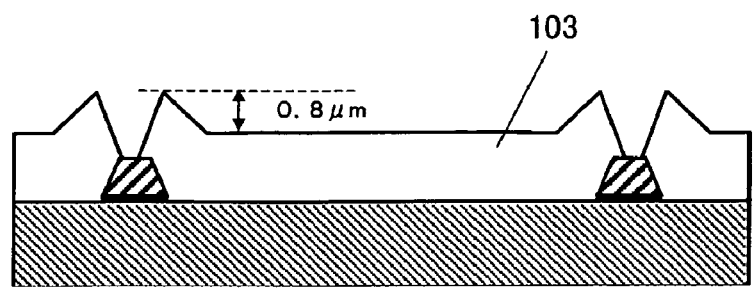
FIG. 10 is an illustration (a sectional view along line A-A') of the method of manufacturing color filters according to the first embodiment of the invention.

Then, CF layers in three colors are formed to a thickness of, for example, 1.8 μm on the substrate having the BM layer thus formed using resists having pigments in three colors R, G, and B dispersed therein (FIG. 10). A CF layer 103 in any of R, G, and B is formed at an opening in the BM.

Since the BM layer is formed with a thickness of about 1.5 μm, the CF layers applied to the BM layer are leveled, and steps are formed with a height of about 0.8 μm above the CF layer surfaces at openings.

Figure 11:
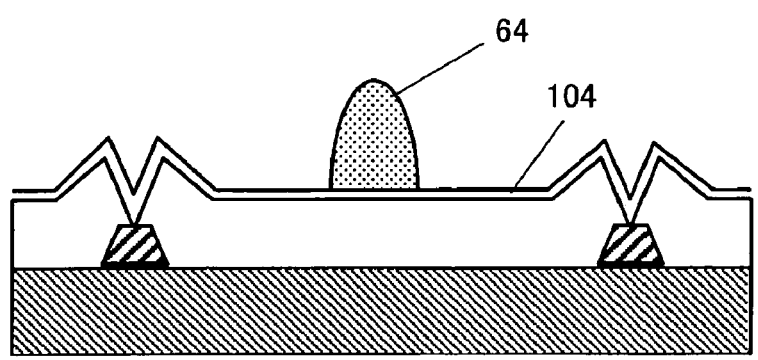
FIG. 11 is an illustration (a sectional view along line A-A') of the method of manufacturing color filters according to the first embodiment of the invention.

The common electrode is provided on the entire surface of the substrate using, for example, an ITO 104, and an alignment regulating protrusion 64 and a spacer layer for maintaining a cell gap (not shown) are formed thereon using a resist to complete the CF substrate (FIG. 11)

In the present embodiment, the photo-resist used for patterning the BM is left on the light shield metal film as it is, and the CF layers are formed on the same. The embodiment therefore has a structure in which a non-common-electrode surface facing the outer periphery of an electrode unit is 0.8 μm higher than a surface of the common electrode surface in a part thereof substantially facing the center of the electrode unit. As a result, a stronger electric field can be generated between the outer periphery of the electrode unit and the common electrode facing the same. Since the alignment regulating protrusion provided in the middle of the electrode unit has a small alignment regulating force near the outer periphery of the electrode unit, liquid crystal alignment in the vicinity of the outer periphery of the electrode unit can be made stable by generating a strong electric field in the same region as in the present embodiment. Display defects such as granularity are thus mitigated, and a high quality liquid crystal display can be provided.

Second Embodiment

A liquid crystal display and a method of manufacturing the same according to a second embodiment of the invention will now be described with reference to FIGS. 12 to 17. A TFT substrate and a CF substrate in the present embodiment are identical in structure to those in the first embodiment. However, the method of manufacturing a BM layer on a CF substrate is different from the first embodiment. The method of manufacturing a CF substrate in the present embodiment will be described with reference to FIGS. 12 to 17.

Figure 12:
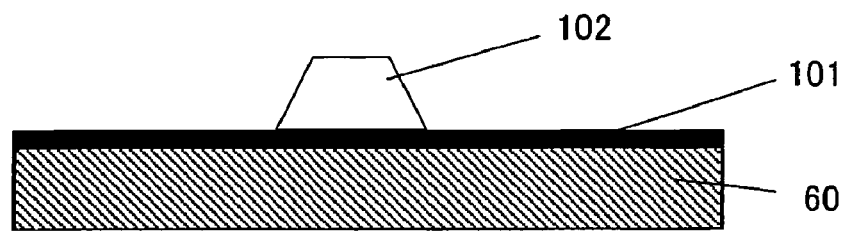
FIG. 12 is an illustration (a sectional view) of a method of manufacturing color filters according to a second embodiment of the invention.

A film of a light shield metal 101 such as chromium is formed on a transparent insulation substrate 60 such as a glass, and a positive resist is applied to the substrate to a thickness of 1.5 µm. After drying the applied film at a temperature of about 100° C., a desired BM pattern 102 is exposed with an exposure energy of about 70 mJ using a proximity aligner. The substrate is then shower-developed using a TMAH developer at an alkali concentration of 2.38% and rinsed using pure water (FIG. 12).

Figure 13:
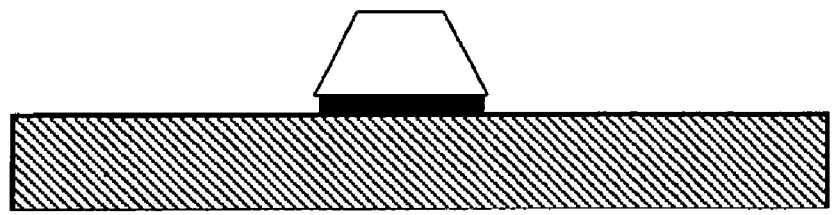
FIG. 13 is an illustration (a sectional view) of the method of manufacturing color filters according to the second embodiment of the invention.
Figure 14:
FIG. 14 is an illustration (a sectional view) of the method of manufacturing color filters according to the second embodiment of the invention.
Figure 15:
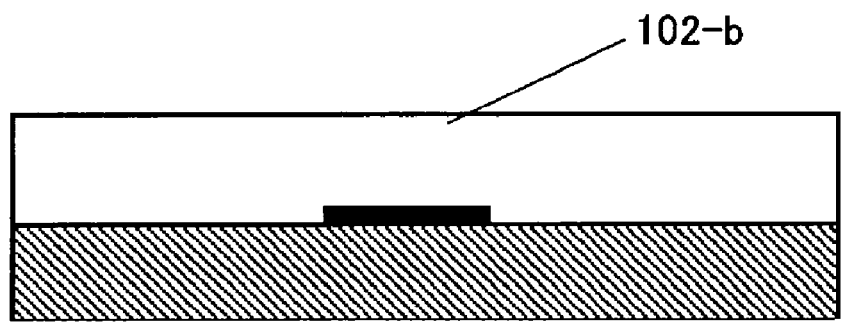
FIG. 15 is an illustration (a sectional view) of the method of manufacturing color filters according to the second embodiment of the invention.

Next, the substrate is immersed in an etchant which is, for example, a mixture of pure water and nitric acid of 8:2 ratio to etch the light shield metal film 101, and the resist 102 is thereafter peeled off using a stripper (FIGS. 13 and 14). Then, a positive resist 102-b is applied to the substrate again to a thickness of 1.5 µm, and drying and baking is then performed (FIG. 15).

Figure 16:
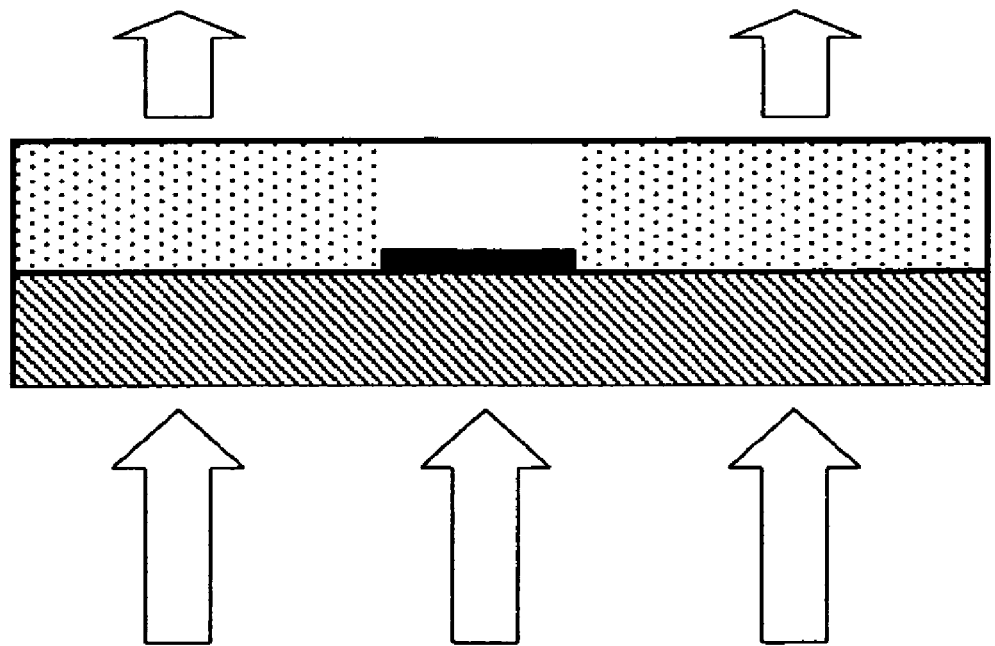
FIG. 16 is an illustration (a sectional view) of the method of manufacturing color filters according to the second embodiment of the invention.

The substrate is irradiated with ultraviolet light of about 100 mJ from the bottom side of the same using the metal film in the pattern of a BM formed on the substrate as a mask (FIG. 16). Then, the resist is developed and baked for one hour in an oven at a temperature of about 220° C.

Figure 17:
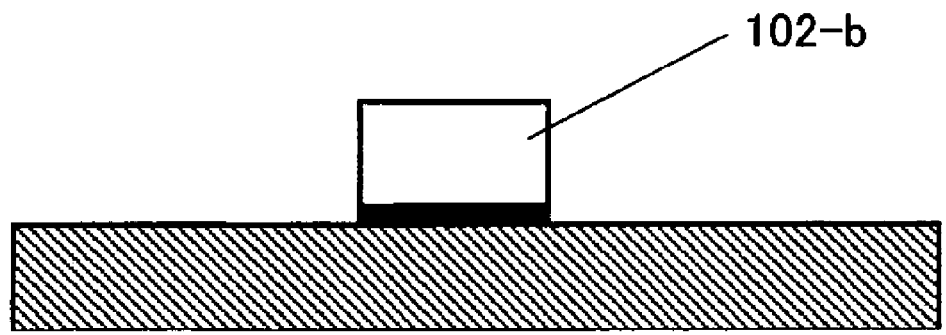
FIG. 17 is an illustration (a sectional view) of the method of manufacturing color filters according to the second embodiment of the invention.

Thereafter, CF layers, a common electrode layer, alignment regulating protrusions, and a spacer layer are formed in the same manner as in the first embodiment to complete a CF substrate. The CF substrate thus fabricated is combined with a TFT substrate in a face-to-face relationship, a liquid crystal is sealed between them and a polarizer is applied to complete a liquid crystal display panel (FIG. 17).

The present embodiment can provide the same advantage as that of the first embodiment because it is identical in structure to the first embodiment and different only in the method of manufacturing the BM layer.

Further, while the resist formed on the substrate as a BM layer in the first embodiment is exposed to an etchant when the metal serving as a light shield film is etched, the resist film formed as a BM layer in the present embodiment is not exposed to an etchant. Therefore, a liquid crystal display of higher reliability can be provided, although there is an increase in man-hour when compared to the first embodiment.

Third Embodiment

Figure 18:
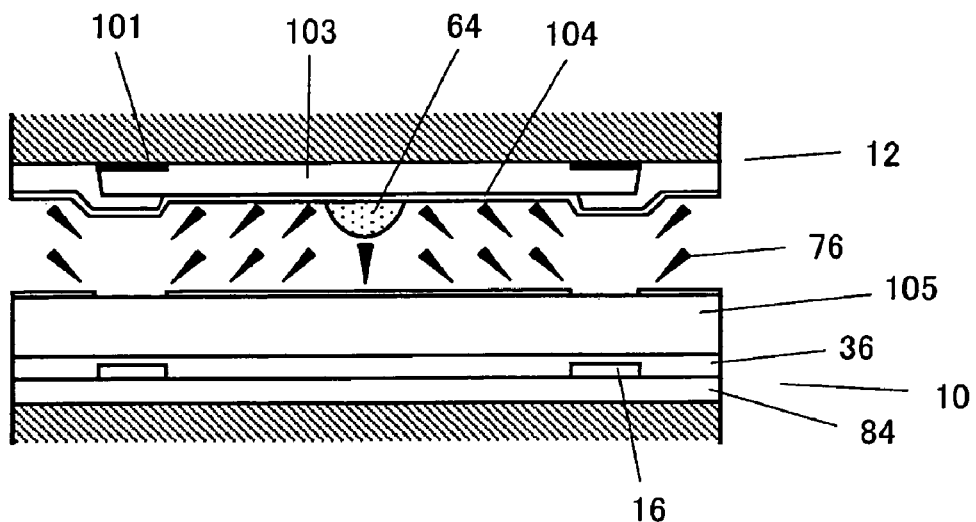
FIG. 18 is a (sectional) view of a liquid crystal display according to a third embodiment of the invention.

A liquid crystal display and a method of manufacturing the same according to a third embodiment of the invention will now be described with reference to FIGS. 18 to 24. FIG. 18 is a sectional view of the liquid crystal display of the present embodiment. Just like the first embodiment, the display has a structure in which a TFT substrate and a CF substrate are combined in a face-to-face relationship and a liquid crystal is sealed between the substrate. The TFT substrate has the same structure as that in the first embodiment. The CF substrate has a structure as follows. Color separation filters in different colors are formed one after another on a BM layer constituted by a metal light shield film formed on a transparent insulation substrate such as a glass, so that steps on the surface of a common electrode above light shield regions at drain wiring portions and storage capacitor portions are adjusted to have a height in the range from 0.4 to 0.6 µm.

Figure 20:
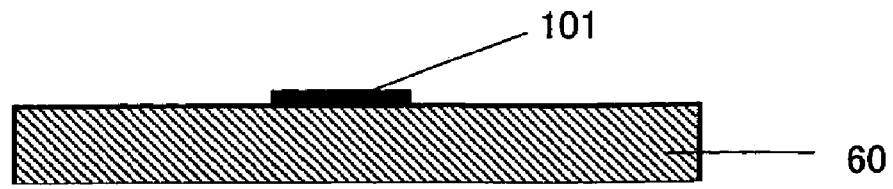
FIG. 20 is an illustration (a sectional view along line B-B') of a method of manufacturing color filters according to the third embodiment of the invention.

A method of fabricating the CF substrate in the present embodiment will now be described with reference to FIGS. 20 to 24. First, a BM pattern having a multi-layer structure of chromium and chromium oxide is formed on a transparent insulation substrate such as a glass using a photolithographic process (FIG. 20).

Figure 21:
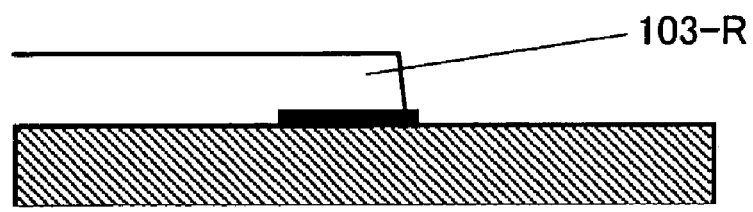
FIG. 21 is an illustration (a sectional view along line B-B') of the method of manufacturing color filters according to the third embodiment of the invention.
Figure 22:
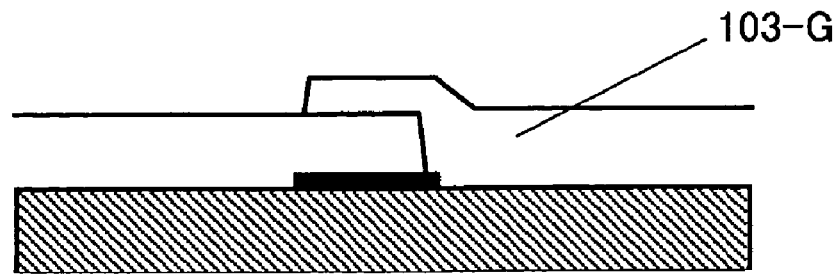
FIG. 22 is an illustration (a sectional view along line B-B') of the method of manufacturing color filters according to the third embodiment of the invention.
Figure 23:
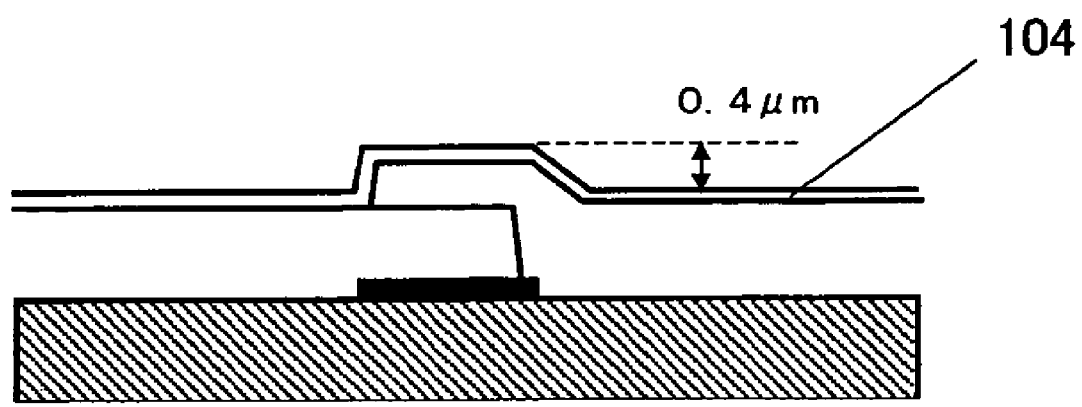
FIG. 23 is an illustration (a sectional view along line B-B') of the method of manufacturing color filters according to the third embodiment of the invention.

Next, CF layers in three colors, i.e., red, green, and blue are sequentially formed on the BM substrate using photo-resists having pigments dispersed therein through a photolithographic process. FIG. 21 is a sectional view of a color layer taken after the formation of a red layer as a first layer. FIG. 22 is a sectional view taken after the formation of a green layer as a second layer. Since the second layer or green layer is formed in an overlapping relationship with the first layer or red layer as shown in FIG. 22, a step of about 0.4 µm is formed on the surface of the overlapped region between the stripes in two colors. Then, a blue layer is formed as a third layer of the color layer to complete the color layer.

Figure 19:
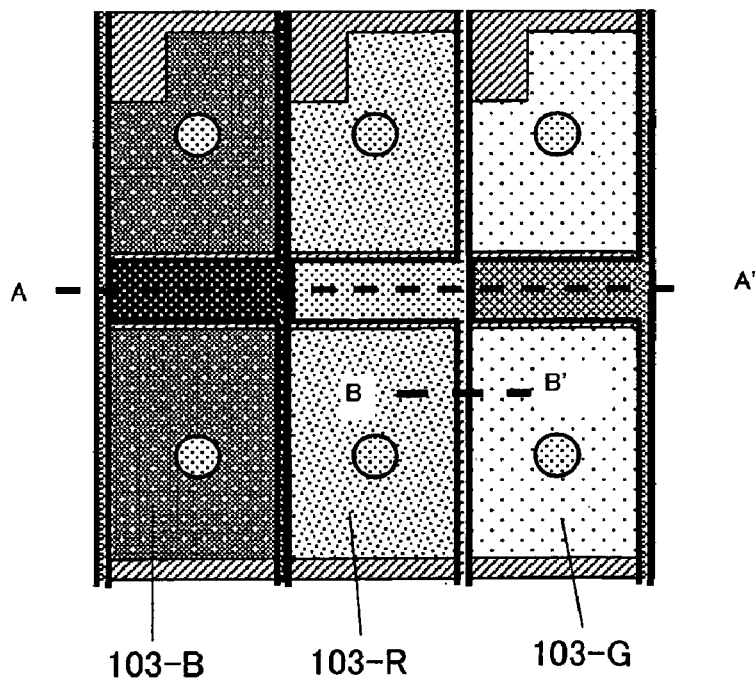
FIG. 19 is a (plan) view of the liquid crystal display according to the third embodiment of the invention.
Figure 24:
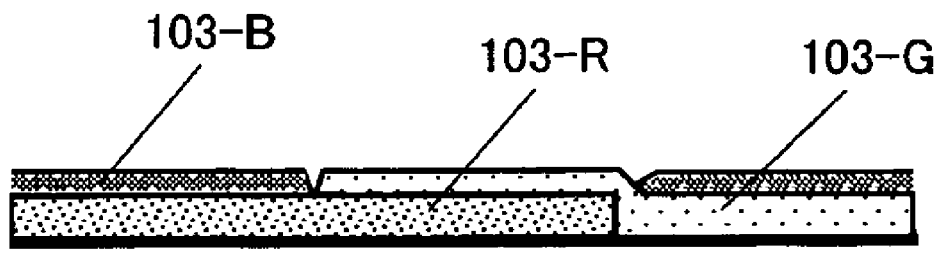
FIG. 24 is a sectional view of color filters (taken along a line A-A' of a liquid crystal display) according to the third embodiment of the invention.
Figure 25:
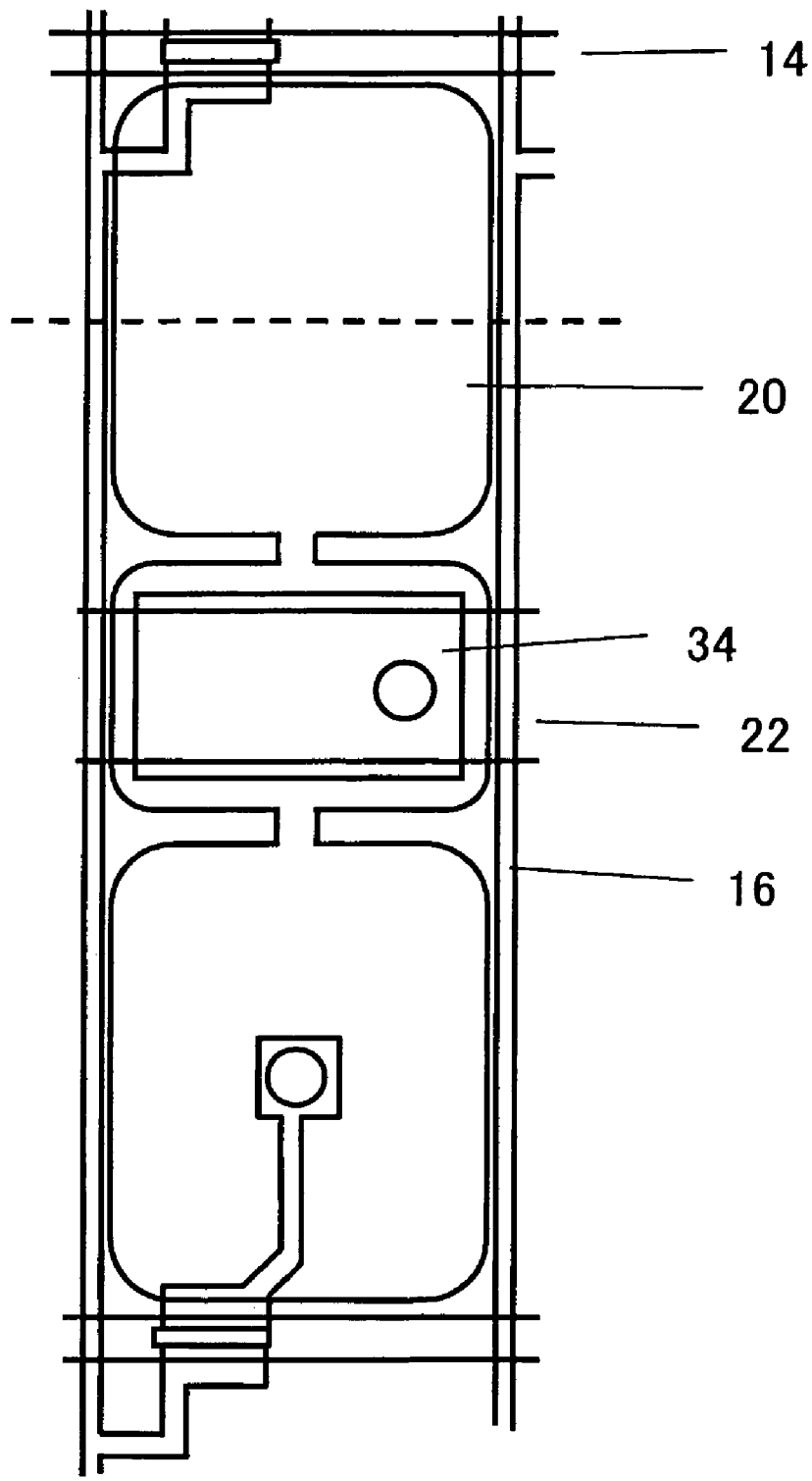
FIG. 25 is a view of a liquid crystal display according to the related art (an elevational view in section of a TFT substrate)
Figure 26:
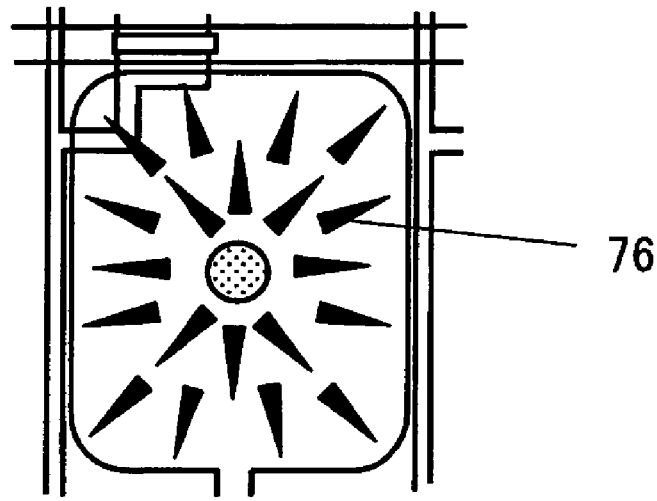
FIG. 26 shows ideal alignment of a liquid crystal.
Figure 27:
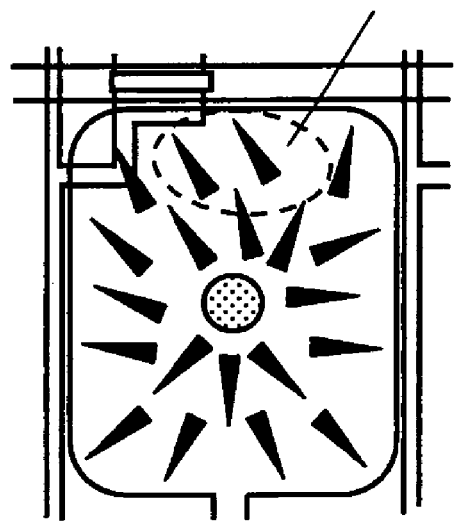
FIG. 27 shows abnormal alignment of a liquid crystal.

FIG. 24 is a sectional view taken along a A-A' line of a plan view in FIG. 19. A transparent common electrode is formed using a ITO as if to cover the entire substrate. Alignment regulating protrusions and a spacer layer are sequentially formed thereon to complete a CF substrate.

As described above, according to the embodiment, a surface of the common electrode facing a non-electrode part at the outer periphery of the electrode unit is at a height of 0.2 µm or more or a height in the range from 0.4 to 1.5 µm if possible above a surface of the common electrode facing a part of the electrode unit substantially in the middle thereof. As a result, electric fields at the outer periphery of the electrode unit have a strong force of regulating the alignment of the liquid crystal, which allows more stable liquid crystal alignment and allows any disturbance in alignment attributable to an external force to be corrected. It is therefore possible to provide a stable liquid crystal display having high display quality.

A step can be formed on the common electrode without any unnecessary pattern protruding into a transmissive part by forming the photo-resist and the color separation filter layer in the order listed on the metal light shield film or forming the color separation filters in different colors one after another on the metal light shield film. It is therefore possible to provide a low-cost and high quality liquid crystal display without any additional process for forming the step.

Further, since the metal light shield film is formed using photolithography and etching, and the photo-resist used for patterning is baked and left on the metal light shield film, the height of the surface of the common electrode can be adjusted in an ideal position, which makes it possible to provide a liquid crystal display of high accuracy and high quality without any additional process.

What is claimed is:
1. A liquid crystal display comprising:
a first substrate having a pixel electrode including one or more electrode units electrically connected to each other in a pixel of the display;
a second substrate facing the pixel electrode and having a light shield portion constituted by a metal film, a color separation filter provided at a location corresponding to an opening defined in the pixel electrode as viewed from above, and a common electrode on a surface thereof; and
a liquid crystal layer having negative dielectric constant anisotropy sealed between the first substrate and the second substrate, wherein a surface of the common electrode facing at least one-fourth of a non-electrode part at the outer periphery of the electrode unit is at a height of 0.2 µm or more above a surface of the common electrode facing a part of the electrode unit substantially in the middle thereof, wherein the non-electrode part is defined as the area where the pixel electrode is not present, wherein a point-like protrusion for regulating the alignment of a liquid crystal is provided on the common electrode on the second substrate facing the part of the electrode unit substantially in the middle thereof, and wherein the common electrode has a concave portion defining a valley at a surface thereof, wherein a central portion of the valley formed by the common electrode is located so as to face substantially a central portion of the non-electrode part.

2. A liquid crystal display according to claim 1, wherein a photo-resist and a color separation filter are formed in the order listed on the metal light shield film.

3. A liquid crystal display according to claim 2, wherein the metal light shield film is formed using photolithography and etching and wherein the photo-resist used for patterning the film is baked and left on the metal light shield film to adjust the height of the surface of the common electrode.

4. A liquid crystal display according to claim 1, wherein color separation filters in different colors are formed one after another on the metal light shield film.

5. A liquid crystal display according to claim 1, wherein the surface of the common electrode facing at least one-fourth of the non-electrode part at the outer periphery of the electrode unit is at a height in the range from 0.4 to 1.5 µm above the surface of the common electrode facing the part of the electrode unit substantially in the middle thereof.

* * * * *